March 8, 1949.  F. GIBADLO  2,463,863
GAS GENERATOR
Filed Nov. 6, 1945
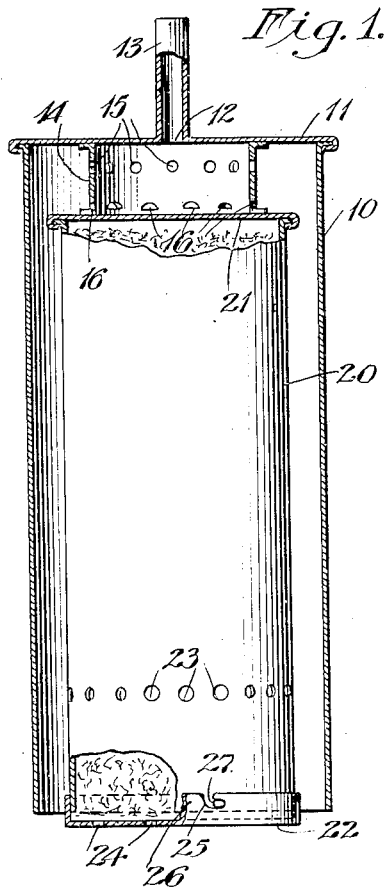
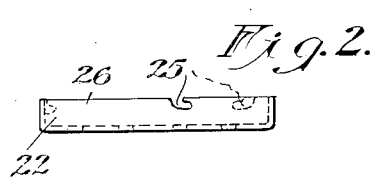
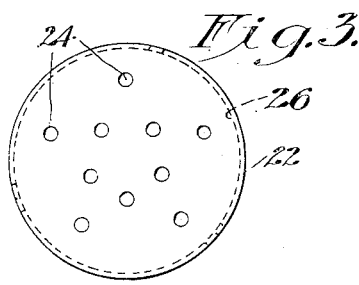
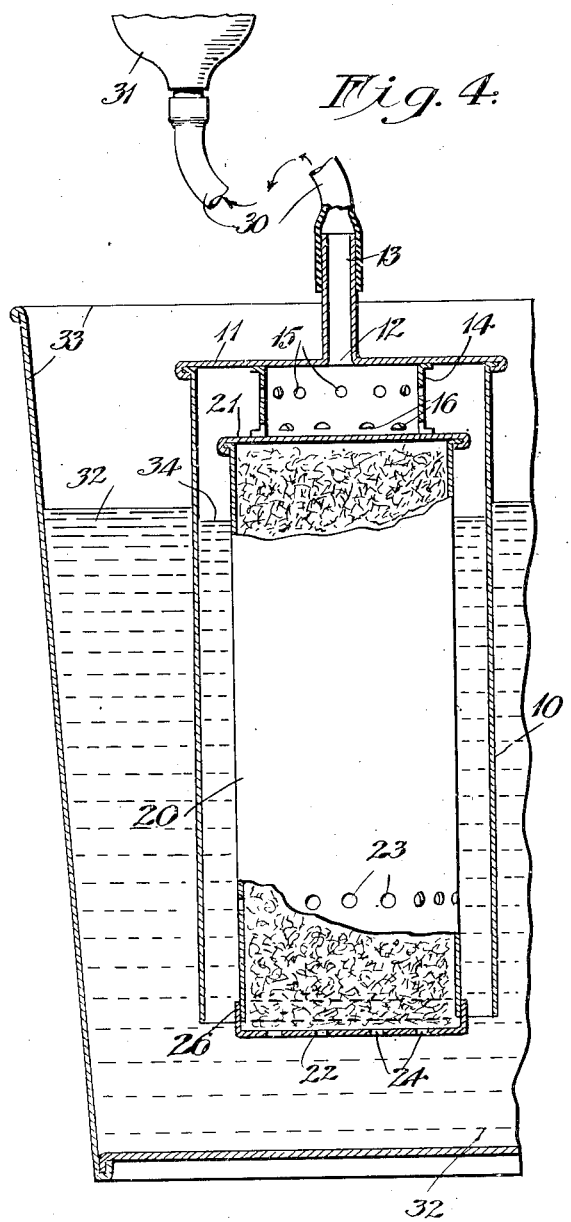
INVENTOR
FRANK GIBADLO
BY
ATTORNEYS Patented Mar. 8, 1949

2,463,863

UNITED STATES PATENT OFFICE 2,463,863

GAS GENERATOR

Frank Gibadlo, Salem, Mass., assignor to Metal Hydrides Incorporated, Beverly, Mass., a corporation of Massachusetts Application November 6, 1945, Serial No. 627,012

10 Claims. (Cl. 23—282)

This invention relates to generators for the production of gas, and has for its object certain improvements in the construction of such generators.

In the production of hydrogen gas on the field, for example, it is customary to react calcium hydride with water as a result of which calcium hydroxide and hydrogen gas are formed. For this purpose, the calcium hydride is usually stored in a sealed can to be used in conjunction with a so-called generator. The generator consists essentially of a large cyclindrical casing made of thin sheet iron having an imperforate top provided with a hole communicating with a pipe through which the hydrogen gas may escape. The bottom of the casing is provided with a perforated baffle having a central opening about which a short externally threaded and depending collar is integrally secured. The top of the can is provided with a complementary recessed and threaded portion having scored markings. When hydrogen gas is to be generated, holes are punched in the scored markings and the recessed portion of the can is tightly screwed onto the depending collar of the generator. In another form, the can is stored in the generator and when placed in use, the can is pulled downwardly and outwardly so that it also depends below the generator. In this case, the top of the can is provided with a large central opening covered with tissue openable on contact with water. When using either type, the generator and can as a unit is then grasped by the operator, who pushes the can and a substantial portion of the generator into a body of water, for example a bucket of water. Water then passes upwardly through the perforated baffle and downwardly through the hole or holes in the top of the can, thus bringing the water into reactive contact with the calcium hydride. Hydrogen gas liberated by the reaction rises upwardly through the generator and passes through the hole and pipe at the top. The hydrogen gas may be piped in this manner, for example, into the envelope of a balloon.

These generators have proved objectionable for a number of reasons. In both types, when adjusted for operation, the can depends below the generator, thus substantially elongating the unit and making it quite large and unwieldy. Since the reaction of calcium hydride with water is an exothermic one, it causes the released hydrogen gas to be quite hot. Although somewhat cooled by the water, the hydrogen in turn heats the casing of the generator, thus making it hot to handle with bare hands. The heated hydrogen gas, moreover, if used to inflate balloons, tends to heat and thus injure the rubber or other fabric envelope. The hydrogen gas also entrains moisture and carries it into the envelope. Another disadvantage is that the calcium hydroxide formed by the reaction tends to flocculate and collect in the can, thus covering calcium hydride not yet reacted upon and retarding the generation of additional hydrogen gas.

Investigation confirms my discovery that a generator and container may be provided which for the most part overcome disadvantages of the character enumerated. Bulk calcium hydride may be used, instead of specially sealed containers of calcium hydride. When the generator is used, the container is kept entirely or substantially entirely within the generator; and the parts are so arranged that the hydrogen gas is bubbled laterally and upwardly through enough water materially to cool the gas so that the generator may be safely held by the operator and the envelope of a balloon will not be heated and injured. Provision may be made to eliminate a good deal of the moisture entrained by the hydrogen before it enters the envelope. In addition, the calcium hydroxide may be easily flushed from the can almost as fast as it forms.

In accordance with the invention, the generator comprises an elongated casing open at its bottom, an imperforate top integrally secured to the casing, an opening in the top for the escape of gas from the casing, a depending collar integrally secured to the underside of the top around the opening, the side wall of the collar being spaced inwardly from the side wall of the casing, the collar being perforated for the passage of gas therethrough to the opening in the top, a container within the casing, the container comprising a casing with an imperforate top secured to the bottom of the collar and an openable bottom, a plurality of holes in the lower portion of the container for the passage of water into and the escape of gas from the container, the side wall of the casing of the container being spaced inwardly from the side wall of the casing of the generator to provide a space for water and the passage of gas upwardly to and through the perforated collar and to and through the opening in the top of the generator.

In a presently preferred practice, the depending collar is perforated with a plurality of relatively small holes so that a plurality of small streams of gas may be passed therethrough. This encourages impingement of the moist gas with the collar so that a substantial amount of its moisture is eliminated before the gas passes through the opening in the top of the generator. A number of the small holes are advantageously placed along the bottom of the depending collar so that they may in addition function as scuppers for the escape of entrained moisture from the interior to the exterior of the collar.

The container in a presently preferred practice of the invention comprises a casing, perforated only in its lower portion; with an imperforate top integrally secured to the bottom of the collar; and with a removable perforated bottom. Permanent holes are provided in the bottom and around the lower portion of the casing so that the unit is in condition for use directly after the container is filled with calcium hydride. When the loaded unit is submerged in water, water promptly passes through the holes in the bottom and reacts with calcium hydride in that portion of the container to form calcium hydroxide and generate hydrogen gas. The calcium hydroxide may be flushed out of the holes in the bottom while the hydrogen gas channels upwardly toward and laterally out of the holes in the lower part of the casing.

These and other features of the invention will be better understood by referring to the accompanying drawing, taken in conjunction with the following description, in which—

Fig. 1 is in part a cross-sectional view in elevation of a generator-container unit illustrative of a practice of the invention, showing a depending collar integrally secured to the underside of the top of the generator and the top of the container;

Fig. 2 is a side view of the removable bottom of the container;

Fig. 3 is a bottom view of the removable bottom of the container; and

Fig. 4 is an elevational view, partly in section, showing the unit partly submerged in water.

Referring first to Figs. 1 and 4, the generator shown comprises an elongated casing 10 having in imperforate top 11 with a centrally disposed hole 12 over which is integrally mounted a conduit 13. A collar 14, suitably spaced from the wall of the casing, depends from the underside of the top, being integrally attached thereto. The collar is provided with a plurality of spaced holes 15 intermediate its top and bottom and a plurality of spaced holes 16 at its bottom to permit the passage therethrough of gas to and through opening 12 in the top and conduit 13. The latter holes function as scuppers for the escape of entrained moisture from the interior to the exterior of the collar.

Still referring to Figs. 1 and 4, the container shown comprises an elongated casing 20 with an imperforate top 21 and a removable bottom 22. The top is integrally secured to the bottom of collar 14. The side wall of casing 20 of the container is spaced inwardly from the side wall of casing 10 of the generator; and top 21 of the container is spaced from top 11 of the generator. A plurality of circumferentially spaced holes 23 are provided in casing 20 near the bottom of the container, primarily for the escape of gas. A plurality of spaced holes 24 (see Fig. 3) are also provided in bottom 22 primarily to permit ingress of water and egress of calcium hydroxide, for example, if calcium hydride is the reactant in the container.

In the construction shown, removable bottom 22 is in the form of a cap or cover which fits snugly over the bottom of casing 20 of the container, being securable thereto by a conventional bayonet lock or clasp comprising a plurality of circumferentially and equally spaced right-angled slots 25 in the side wall 26 of the cover, each slot in turn being adapted to receive a similarly spaced lug 27 integrally secured to the side wall of casing 20.

Casing 10 of the generator may be varied in length. For example, it may be made sufficiently long so that the container is entirely contained within the generator. In a presently preferred practice, casing 20 of the container, or at least removable bottom 22, extends somewhat beyond the bottom of casing 10 so that the removable bottom may more easily be secured to and removed from the lower end of the container. With the removable bottom extending slightly beyond casing 10, the operator may grasp the removable bottom and manipulate it without injuring his fingers by jamming them against the bottom edge of casing 10.

When it is desired to generate hydrogen gas, for example to inflate a balloon, the container is filled with calcium hydride; removable bottom 22 is secured to the lower end of casing 20; one end of a rubber tubing 30 is advantageously mounted on the free end of conduit 13 and the open end of the envelope 31 of the balloon is fitted tightly (through an intermediate connection, if desired) onto the other end of the rubber tubing. The lower portion of the loaded unit is then pushed into a convenient body of water 32. The water may, for example, be held in a bucket 33. To facilitate ingress of water and egress of calcium hydroxide through holes 24 and egress of the resulting hydrogen gas through holes 23, the unit may be moved about in the water. As the calcium hydride in the bottom of the container is converted to calcium hydroxide and hydrogen gas and the calcium hydroxide is flushed out of the container, calcium hydride farther up in the container drops to the bottom to join in the reaction. The container is in effect self-cleaning due to its construction.

In the assembly shown, the hydrogen gas escapes laterally through holes 23 from the container into the space between casings 10 and 20. As a result of the exothermic reaction between the calcium hydride and water, the hydrogen gas is heated. The hot gas then bubbles upwardly in the annular column of water 34 between the casings and is substantially cooled. As the cooled gas rises from the surface of the annular column of water, it continues to move upwardly in the space between the two casings, laterally to and through holes 15 and 16 in depending collar 14, and upwardly through opening 12, conduit 13, rubber tubing 30 into envelope 31 of the balloon.

Due to the manner in which collar 14 is perforated, it acts as a baffle to the passage of the moistened hydrogen gas. As the gas passes through holes 15 and 16, a substantial amount of its entrained moisture is eliminated by the collar wall. Such moisture as collects inside the collar is drained through the lower holes, thus permitting drier hydrogen to be passed into the balloon. In general, the smaller the holes the smaller are the streams of gas flowing into the collar and the more readily will the gas impinge against the wall of the collar, inside and outside, thus causing the moisture in the gas to merge with moisture accumulating on the wall. So far as the passage of gas through the collar is concerned, the holes may be of any size and number sufficient to permit such passage as fast as the gas is generated, to avoid building up any substantial back pressure. The collar as illustrated is somewhat higher in proportion to the other elements than is necessary. In other words, the height of the collar may be reduced to a minimum consistent with its function so as to conserve space and thereby permit the use of a casing 10 of minimum length. The generator and container may therefore be joined in a unit of maximum compactness.

After all of the calcium hydride has undergone reaction with the water and the generator-container unit has been swished about in the water to clean the container, bottom 24 may be removed, a fresh charge of calcium hydride placed in the container, and the bottom returned to generate additional hydrogen gas.

It will be clear to those skilled in this art that the practice of the invention disclosed readily lends itself to a number of useful modifications.

I claim:

1. In a generator for the production of gas, the improvement comprising an elongated casing open at its bottom, an imperforate top integrally secured to the casing, an opening in the top for the escape of gas from the casing, a depending collar integrally secured to the underside of the top around the opening, the side wall of the collar being spaced inwardly from the side wall of the casing, the collar being perforated for the passage of gas therethrough to the opening in the top, a container within the casing, the container comprising a casing with an imperforate top integrally secured to the bottom of the collar and an openable bottom, a plurality of holes in the lower portion of the container for the passage of water into and the escape of gas from the container, the side wall of the casing of the container being spaced inwardly from the side wall of the casing of the generator to provide a space for water and the passage of gas upwardly to and through the perforated collar and to and through the opening in the top of the generator.

2. In a generator for the production of gas, the improvement comprising an elongated casing open at its bottom, an imperforate top integrally secured to the casing, a central opening in the top for the escape of gas from the casing, a depending collar integrally secured to the underside of the top around the central opening, the side wall of the collar being spaced concentrically and inwardly from the side wall of the casing, the collar being perforated for the passage of gas therethrough to the opening in the top, a container within the casing, the container comprising a casing with an imperforate top integrally secured to the bottom of the collar and an openable bottom, a plurality of holes in the lower portion of the container for the passage of water into and the escape of gas from the container, the side wall of the casing of the container being spaced inwardly from the side wall of the casing of the generator to provide a space for water and the passage of gas upwardly to and through the perforated collar and to and through the opening in the top of the generator.

3. In a generator for the production of gas, the improvement comprising an elongated casing open at its bottom, an imperforate top integrally secured to the casing, an opening in the top for the escape of gas from the casing, a depending collar integrally secured to the underside of the top around the opening, the side wall of the collar being spaced inwardly from the side wall of the casing, the collar being perforated for the passage of gas therethrough to the opening in the top, a container within the casing, the container comprising a casing with an imperforate top integrally secured to the bottom of the collar and an openable bottom, a plurality of holes in the bottom and the side wall of the casing of the container for the passage of water into and the escape of gas from the container, the side wall of the casing of the container being spaced inwardly from the side wall of the casing of the generator to provide a space for water and the passage of gas upwardly to and through the perforated collar and to and through the opening in the top of the generator.

4. In a generator for the production of gas, the improvement comprising an elongated casing open at its bottom, an imperforate top integrally secured to the casing, a central opening in the top for the escape of gas from the casing, a depending collar integrally secured to the underside of the top around the central opening, the side wall of the collar being spaced concentrically and inwardly from the side wall of the casing, the collar being perforated for the passage of gas therethrough to the opening in the top, a container within the casing, the container comprising a casing with an imperforate top integrally secured to the bottom of the collar and an openable bottom, a plurality of holes in the bottom and the side wall of the casing of the container for the passage of water into and the escape of gas from the container, the side wall of the casing of the container being spaced inwardly from the side wall of the casing of the generator to provide a space for water and the passage of gas upwardly to and through the perforated collar and to and through the opening in the top of the generator.

5. In a generator for the production of gas, the improvement comprising an elongated casing open at its bottom, an imperforate top integrally secured to the casing, an opening in the top for the escape of gas from the casing, a depending collar integrally secured to the underside of the top around the opening, the side wall of the collar being spaced inwardly from the side wall of the casing, the collar being perforated for the passage of gas therethrough to the opening in the top, a container within the casing, the container comprising a casing with an imperforate top integrally secured to the bottom of the collar and an openable bottom, a plurality of holes in the bottom and the side wall of the casing of the container for the passage of water into and the escape of gas from the container, the side wall of the casing of the container being spaced inwardly from the side wall of the casing of the generator to provide a space for water and the passage of gas upwardly to and through the perforated collar and to and through the opening in the top of the generator, the bottom of said container extending outwardly beyond the bottom of the casing to facilitate opening and closing the bottom of the container.

6. In a generator for the production of gas, the improvement comprising an elongated casing open at its bottom, an imperforate top integrally secured to the casing, a central opening in the top for the escape of gas from the casing, a depending collar integrally secured to the underside of the top around the central opening, the side wall of the collar being spaced concentrically and inwardly from the side wall of the casing, the collar being perforated for the passage of gas therethrough to the opening in the top, a container within the casing, the container comprising a casing with an imperforate top integrally secured to the bottom of the collar and an openable bottom, a plurality of holes in the bottom and the side wall of the casing of the container for the passage of water into and the escape of gas from the container, the side wall of the casing of the container being spaced inwardly from the side wall of the casing of the generator to provide a space for water and the passage of gas upwardly to and through the perforated collar and to and through the opening in the top of the generator, the bottom of said container extending outwardly beyond the bottom of the casing to facilitate opening and closing the bottom of the container.

7. In a generator for the production of gas, the improvement comprising an elongated casing open at its bottom, an imperforate top integrally secured to the casing, an opening in the top for the escape of gas from the casing, a depending collar integrally secured to the underside of the top around the opening, the side wall of the collar being spaced inwardly from the side wall of the casing, the collar being perforated for the passage of gas therethrough to the opening in the top, a container within the casing, the container comprising a casing with an imperforate top integrally secured to the bottom of the collar and a removable bottom, means for securing the removable bottom to the casing of the container, a plurality of holes in the bottom and the side wall of the casing of the container for the passage of water into and the escape of gas from the container, the side wall of the casing of the container being spaced inwardly from the side wall of the casing of the generator to provide a space for water and the passage of gas upwardly to and through the perforated collar and to and through the opening in the top of the generator, the bottom of said container extending outwardly beyond the bottom of the casing to facilitate opening and closing the bottom of the container.

8. In a generator for the production of gas, the improvement comprising an elongated casing open at its bottom, an imperforate top integrally secured to the casing, a central opening in the top for the escape of gas from the casing, a depending collar integrally secured to the underside of the top around the central opening, the side wall of the collar being spaced concentrically and inwardly from the side wall of the casing, the collar being perforated for the passage of gas therethrough to the opening in the top, a container within the casing, the container comprising a casing with an imperforate top integrally secured to the bottom of the collar and a removable bottom, means for securing the removable bottom to the casing of the container, a plurality of holes in the bottom and the side wall of the casing of the container for the passage of water into and the escape of gas from the container, the side wall of the casing of the container being spaced inwardly from the side wall of the casing of the generator to provide a space for water and the passage of gas upwardly to and through the perforated collar and to and through the opening in the top of the generator, the bottom of said container extending outwardly beyond the bottom of the casing to facilitate opening and closing the bottom of the container.

9. In a generator for the production of gas, the improvement comprising an elongated casing open at its bottom, an imperforate top integrally secured to the casing, an opening in the top for the escape of gas from the casing, a depending collar integrally secured to the underside of the top around the opening, the side wall of the collar being spaced inwardly from the side wall of the casing, the collar being provided with a plurality of relatively small spaced holes adapted to act as a baffle in entraining moisture from gas passing through the holes to the opening in the top, a container within the casing, the container comprising a casing with an imperforate top integrally secured to the bottom of the collar and an openable bottom, a plurality of holes in the lower portion of the container for the passage of water into and the escape of gas from the container, the side wall of the casing of the container being spaced inwardly from the side wall of the casing of the generator to provide a space for water and the passage of gas upwardly to and through the perforated collar and to and through the opening in the top of the generator.

10. In a generator for the production of gas, the improvement comprising an elongated casing open at its bottom, an imperforate top integrally secured to the casing, an opening in the top for the escape of gas from the casing, a depending collar integrally secured to the underside of the top around the opening, the side wall of the collar being spaced inwardly from the side wall of the casing, the collar being provided with a plurality of relatively small spaced holes adapted to act as a baffle in entraining moisture from gas passing through the holes to the opening in the top, some of said holes being located along the bottom of the collar to act as scuppers in returning entrained moisture from the interior to the exterior of the collar, a container within the casing, the container comprising a casing with an imperforate top integrally secured to the bottom of the collar and an openable bottom, a plurality of holes in the lower portion of the container for the passage of water into and the escape of gas from the container, the side wall of the casing of the container being spaced inwardly from the side wall of the casing of the generator to provide a space for water and the passage of gas upwardly to and through the perforated collar and to and through the opening in the top of the generator.

FRANK GIBADLO.

REFERENCES CITED

The following references are of record in the file of this patent:

UNITED STATES PATENTS

| Number | Name | Date |
|---|---|---|
| 1,684,979 | Valentour | Sept. 18, 1928 |
| 2,211,430 | Ness | Aug. 13, 1940 |

FOREIGN PATENTS

| Number | Country | Date |
|---|---|---|
| 718 | Austria | Dec. 27, 1899 |